United States Patent
Ishiba

(10) Patent No.: US 7,686,579 B2
(45) Date of Patent: Mar. 30, 2010

(54) DUCTED FAN

(75) Inventor: Masatsugu Ishiba, Gotenba (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 701 days.

(21) Appl. No.: 11/497,304

(22) Filed: Aug. 2, 2006

(65) Prior Publication Data

US 2009/0304504 A1  Dec. 10, 2009

(30) Foreign Application Priority Data

Aug. 3, 2005  (JP)  ............... 2005-225694

(51) Int. Cl.
 *F04D 29/54* (2006.01)
(52) U.S. Cl. ............ 415/202; 415/77; 415/211.2; 415/222; 415/223; 415/914; 244/17.23; 244/23 A; 244/23 C; 244/73 B
(58) Field of Classification Search ............ 415/77–79, 415/211.2, 202, 220, 222, 223, 914; 416/189, 416/192; 244/12.1, 12.2, 17.23, 23 A, 23 C, 244/73 B
See application file for complete search history.

(56) References Cited

U.S. PATENT DOCUMENTS

| 218,605 | A | * | 8/1879 | Vliet | ............ 415/211.2 |
| 1,432,787 | A | * | 10/1922 | Reyes | ............ 244/12.1 |
| 3,029,045 | A | * | 4/1962 | Bertin et al. | ............ 415/79 |
| 5,533,862 | A | * | 7/1996 | Jung | ............ 415/220 |
| 7,470,108 | B2 | * | 12/2008 | Watanabe et al. | ............ 415/211.2 |

FOREIGN PATENT DOCUMENTS

| JP | 38-253633 | 3/1960 |
| JP | 3-70699 | 3/1991 |
| JP | 06-293296 | 10/1994 |
| JP | 2004-268640 | 9/2004 |
| JP | 2005-125976 | 5/2005 |
| JP | 2005-145264 | 6/2005 |

OTHER PUBLICATIONS

Notification of Reasons for Refusal from the Japanese Patent Office for JP 2005-225694 mailed Oct. 6, 2009.

* cited by examiner

*Primary Examiner*—Christopher Verdier
(74) *Attorney, Agent, or Firm*—Finnegan, Henderson, Farabow, Garrett & Dunner, LLP

(57) ABSTRACT

A ducted fan includes a fan that generates an airflow that flows substantially parallel with the axis of the rotating shaft of the fan; a duct, arranged around the fan, that extends in the direction of the rotating shaft of the fan and includes an airflow inlet defined by the upstream end and an airflow outlet defined by the downstream end, and that has a ramp portion formed in the inner face of the airflow inlet; an airflow guide portion, provided at the airflow outlet, that introduces air from outside of the duct to a position downstream of the airflow outlet; and a negative-pressure forming portion, provided at the downstream end of the airflow guide portion. The negative-pressure forming portion generates a negative pressure near the downstream end of the airflow guide portion when air passes by the negative-pressure forming portion.

8 Claims, 14 Drawing Sheets

F I G . 8
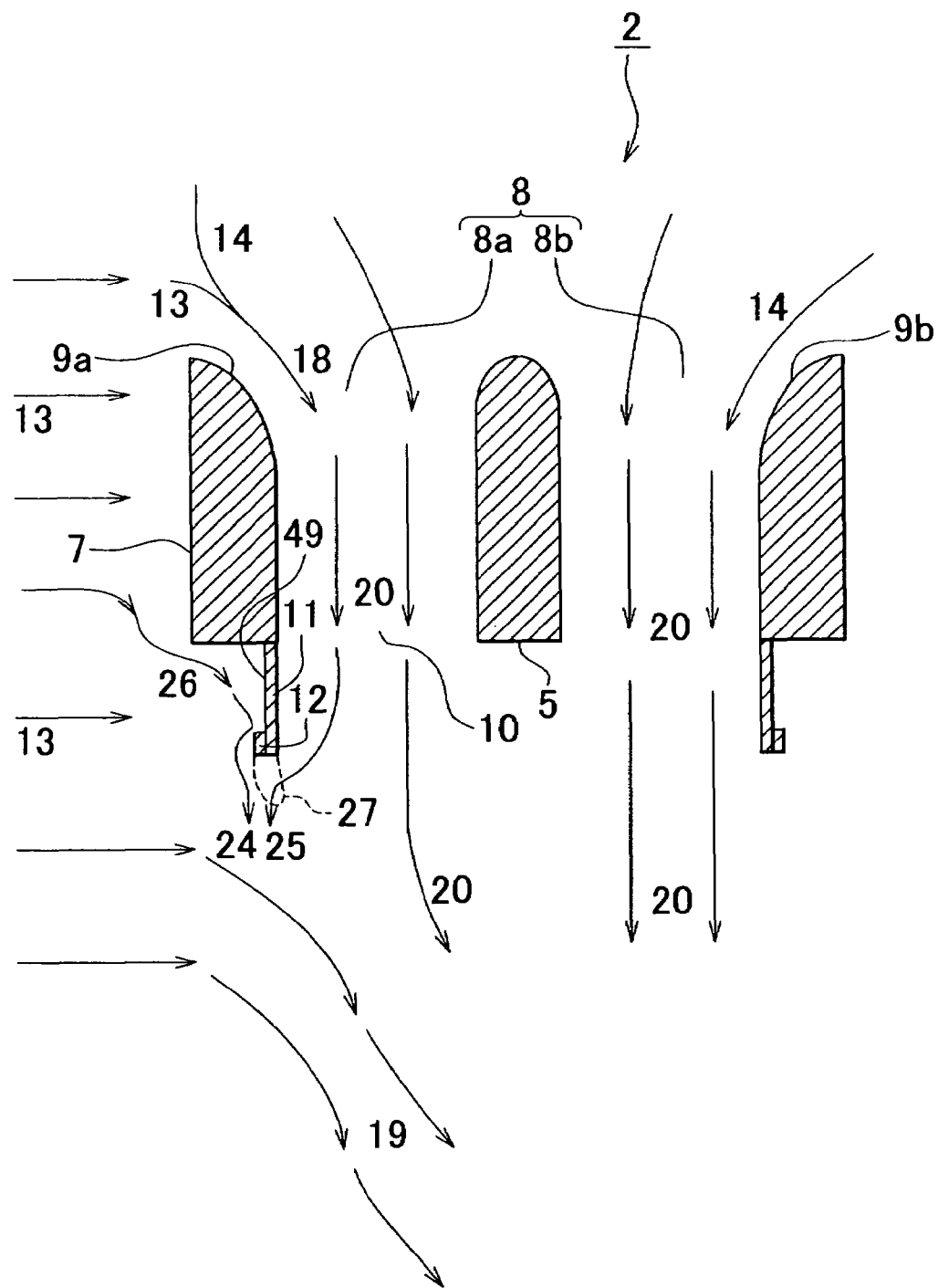

ns of the duct. In particular, decreases in the flow speed of the airflow coming out of the rear airflow outlet decrease the thrust applied to the rear portion of the duct. This may make it difficult to produce a moment that is applied in the direction in which the rear portion of the duct moves upward.

DUCTED FAN

INCORPORATION BY REFERENCE

The disclosure of Japanese Patent Application No. 2005-225694 filed on Aug. 3, 2005 including the specification, drawings, and abstract is incorporated herein by reference in its entirety.

BACKGROUND OF THE INVENTION

1. Field of the Invention

The invention relates to a ducted fan that produces thrust through the rotation of a fan arranged in a duct.

2. Description of the Related Art

Using a ducted fan as a thrust producing device for a vertical take-off and landing aircraft has been proposed.

Japanese Patent Application Publication No. JP-A-2005-145264 describes a vertical take-off and landing aircraft. In the described vertical take-off and landing aircraft, the magnitude of negative pressure, which is formed when air flows, is changed in a lip portion through which air is introduced into a duct of a ducted fan. Thus, the magnitude of a thrust produced is flexibly controlled.

Japanese Patent Application Publication No. JP-A-03-70699 also describes a vertical take-off and landing aircraft. According to Japanese Patent Application Publication No. JP-A-03-70699, the pitch angle of a blade of a ducted fan and the speed of an engine that drives the ducted fan are controlled. Thus, the magnitude of a thrust produced is flexibly controlled.

However, the following phenomenon may occur in a ducted fan mounted in an aircraft. If a crosswind blows against the side face of the ducted fan during flight, the airflow going into the duct and the crosswind join together at an air-introduction portion of a portion of the duct, the portion being exposed to the crosswind (hereinafter, such air-introduction portion will be referred to as a "front air-introduction portion"). As a result, the flow speed of the air entering the air-introduction portion increases.

Accordingly, a negative pressure formed at the front air-introduction portion is greater than a negative pressure formed in an air-introduction portion of another portion of the duct, the portion not being exposed to the cross wind (hereinafter, such air-introduction portion will be referred to as a "rear air-introduction portion").

Accordingly, the front air-introduction portion is attracted in the direction, in which the negative pressure is applied, more strongly than the rear air-introduction portion is. Therefore, a moment, which is applied in the direction in which the front portion of the ducted fan moves upward, may be produced.

An airflow outlet is formed in the lower portion of the ducted fan. The airflow, which has passed through the duct, comes out of the airflow outlet. In an area downstream of the airflow outlet, the airflow coming out of the duct and the crosswind join together, and the direction of the airflow on the downstream end of the duct (hereinafter, such airflow will be referred to as the "descending airflow") approaches the direction of the crosswind.

Because the direction of the descending airflow is influenced by the crosswind, the descending airflow proceeds through the area downstream of the duct so as to pass over the airflow outlet. This interrupts the flow path along which the airflow comes vertically out of the airflow outlet of the duct.

As a result, the air cannot smoothly flow out of the duct, which may decrease the flow speed of the airflow coming out of the duct. In particular, decreases in the flow speed of the airflow coming out of the rear airflow outlet decrease the thrust applied to the rear portion of the duct. This may make it difficult to produce a moment that is applied in the direction in which the rear portion of the duct moves upward.

Hereafter, the above-described phenomenon, which is caused when the ducted fan is exposed to the crosswind, will be described in detail with reference to FIGS. 1 and 2.

FIG. 1 illustrates the airflows that are generated around a ducted fan 200 and in a duct 7 when a crosswind 13 blows against the side face of the ducted fan 200 from the outside of the ducted fan 200. The arrows in FIG. 1 indicate the directions of airflows. To facilitate the understanding of the directions of the airflows, the fan provided in the duct 7 is not shown in FIG. 1.

First, the airflows near an airflow inlet 8 will be described with reference to FIG. 1. An airflow 14 generated due to the turning motion of the fan and the crosswind 13 join together in a front airflow inlet 8a to generate a combined airflow 18. The combined airflow proceeds faster than the airflow 14 flowing through a rear airflow inlet 8b.

Next, the airflows near an airflow outlet 10 will be described with reference to FIG. 1. An airflow 20 coming out of the airflow outlet 10 and the crosswind 13 join together, which causes the direction of a descending airflow 19 to approach the direction of the crosswind 13.

Because the direction of the descending airflow 19 is influenced by the crosswind 13, the descending airflow 19 proceeds through the area downstream of the duct 7 so as to pass over the airflow outlet 10. This interrupts the flow path along which the airflow 20 comes vertically out of the airflow outlet 10.

As a result, the air does not flow smoothly out of the airflow outlet 10.

FIG. 2 illustrates the flow speed distribution of the airflows generated around the ducted fan 200 and in the duct 7, the directions and magnitudes of thrusts produced by the airflows, and the directions and the magnitudes of moments produced by the thrusts, in the case where the crosswind 13 blows against the side face of the ducted fan 200 from the outside of the ducted fan 200.

Due to the above-described airflows near the airflow inlet 8, the negative pressure formed at a ramped portion 9a, which is formed on the inner face of the front portion the duct 7 (hereinafter, referred to as a "front ramp portion 9a"), is greater than the negative pressure formed at a ramp portion 9b, which is formed in the inner face of the rear portion of the duct 7 (hereinafter, referred to as a "rear ramp portion 9b"). Accordingly, a force 15 for attracting the front ramp portion 9a is stronger than a force 16 for attracting the rear ramp portion 9b, whereby the front ramp portion 9a is attracted in the direction, in which the negative pressure is applied, more strongly than the rear ramp portion 9b is. Thus, a moment 17, which is applied in the direction in which the front ramp portion 9a moves upward, is produced.

A flow speed distribution area 21 is formed in the duct 7 and on the downstream end of the duct 7. In the flow speed distribution area 21, the airflows proceed at flow speeds equal to or higher than a predetermined value.

Due to such airflows, a thrust 22a is applied to the front portion of the duct 7 (hereinafter, such thrust will be referred to as a "front fan thrust"), and a thrust 22b is applied to the rear portion of the duct 7 (hereinafter, such thrust will be referred to as a "rear fan thrust"). Thus, a moment 23, which is applied in the direction in which the rear portion of the duct 7 moves upward, is produced.

As shown in FIG. 2, the moment 23 is not great enough to completely offset the moment 17, which is applied in the direction in which the front ramp portion 9a moves upward. Accordingly, if the ducted fan 200 is exposed to the crosswind 13, a moment, which is applied in the direction in which the front portion of the duct 7 moves upward (hereinafter, such moment will be referred to as a "pitch-up moment"), is ultimately produced.

As described so far, in the ducted fan according to the related art, the pitch-up moment, which is applied in the direction in which the front portion of the duct moves upward, may be produced when the ducted fan is exposed to the crosswind.

SUMMARY OF THE INVENTION

An aspect of the invention relates to a ducted fan that includes a fan, a duct, an airflow guide portion, and a negative-pressure forming portion. The fan generates an airflow that flows substantially parallel to the rotating shaft of the fan. The duct is arranged around the fan so as to extend in the direction of the rotating shaft of the fan. The duct has an airflow inlet defined by the upstream end and an airflow outlet defined by the downstream end. The duct has a ramp portion formed in the inner face of the upstream end, which defines the airflow inlet. The airflow guide portion is provided at the airflow outlet. The airflow guide portion introduces air that blows against the side face of the duct from the outside of the duct ("outside air"), to a position downstream of the airflow outlet. The negative-pressure forming portion is provided at the downstream end of the airflow guide portion. The negative-pressure forming portion forms a negative pressure in an area near the downstream end of the airflow guide portion, when the air introduced by the airflow guide portion passes by the negative-pressure forming portion.

In the ducted fan thus configured, the airflow is generated by the turning motion of the fan provided in the duct. The airflow goes into the duct through the airflow inlet of the duct, and then comes out of the airflow outlet of the duct. Thrust is produced by a reaction force, which is produced when the airflow comes out of the airflow outlet of the duct.

When the airflow goes into the duct through the airflow inlet, the flow speed of the airflow increases at the ramp portion formed in the inner face of the upstream end of the duct, which defines the airflow inlet, whereby a negative pressure is formed on the surface of the ramp portion. Thus, a force for attracting the ramp portion in the direction, in which the negative pressure is applied, is applied. This force forms part of the thrust.

When outside air, which acts as a disturbance for the ducted fan (hereinafter, such air will be referred to as a "crosswind"), blows against the side face of the ducted fan, part of the crosswind is introduced to a position downstream of the airflow outlet of the duct by the airflow guide portion.

The crosswind introduced to the position downstream of the outlet of the duct passes by the negative-pressure forming portion provided at the downstream end of the airflow guide portion. At this time, the negative-pressure forming portion changes the direction of the crosswind. Such change in the direction of the airflow forms the negative pressure near the negative-pressure forming portion.

Part of the airflow coming out of the airflow outlet of the duct is guided in the direction in which the negative pressure is applied. Especially, if the airflow, which proceeds along the inner face of the portion of the duct, the portion being exposed to the crosswind (hereinafter, referred to as the "front portion of the duct"), is guided in the direction in which the negative pressure is applied, the direction of the airflow below the duct (hereinafter, referred to as a "descending airflow") does not easily approach the direction of the crosswind.

Accordingly, proceeding of the descending airflow through the area downstream of the airflow outlet of the duct so as to pass over the airflow outlet is suppressed. As a result, the flow path, along which the airflow coming vertically out of the airflow outlet of the duct, is not easily interrupted.

Thus, the air flows out of the duct more smoothly, and decreases in the flow speed of the airflow coming out of the duct are suppressed.

In particular, decreases in the flow speed in the airflow coming out of the portion of the duct, the portion not exposed to the crosswind (hereinafter, referred to as the "rear portion of the duct"), increases the thrust that applies to the rear portion of the duct, as compared to the ducted fan according to the related art described above. Accordingly, the moment, which is applied in the direction in which the rear portion of the duct moves upward, increases as compared with the ducted fan according to the related art.

The moment that is produced when the ducted fan is exposed to the crosswind is the combination of the moment, which is produced by the airflow near the front airflow inlet and which is applied in the direction in which the front ramp portion moves upward, and the moment, which is produced when the air comes out of the duct and which is applied in the direction in which the rear portion of the duct moves upward.

As described above, the moment, which is applied in the direction in which the rear portion of the duct moves upward, is greater than that in the ducted fan according to the related art. As a result, the moment, which is applied in the direction in which the front portion of the ducted fan moves upward (hereinafter, referred to as the "pitch-up moment") is less than that in the ducted fan according to the related art. Thus, the need for the attitude control for offsetting the pitch-up moment is reduced, which improves the fuel efficiency and the flight distance.

BRIEF DESCRIPTION OF THE DRAWINGS

The foregoing and/or further objects, features and advantages of the invention will become more apparent from the following description of example embodiments with reference to the accompanying drawings wherein the same or corresponding portions will be denoted by the same reference numerals and wherein:

FIG. 8 is the view showing airflows generated around the ducted fan and in a duct according to the first embodiment of the invention;

DETAILED DESCRIPTION OF THE EXAMPLE EMBODIMENTS

In the following description, the invention will be described in more detail in terms of example embodiments.

In the embodiments described below, a ducted fan is mounted in a vertical take-off and landing aircraft.

Figure 3:
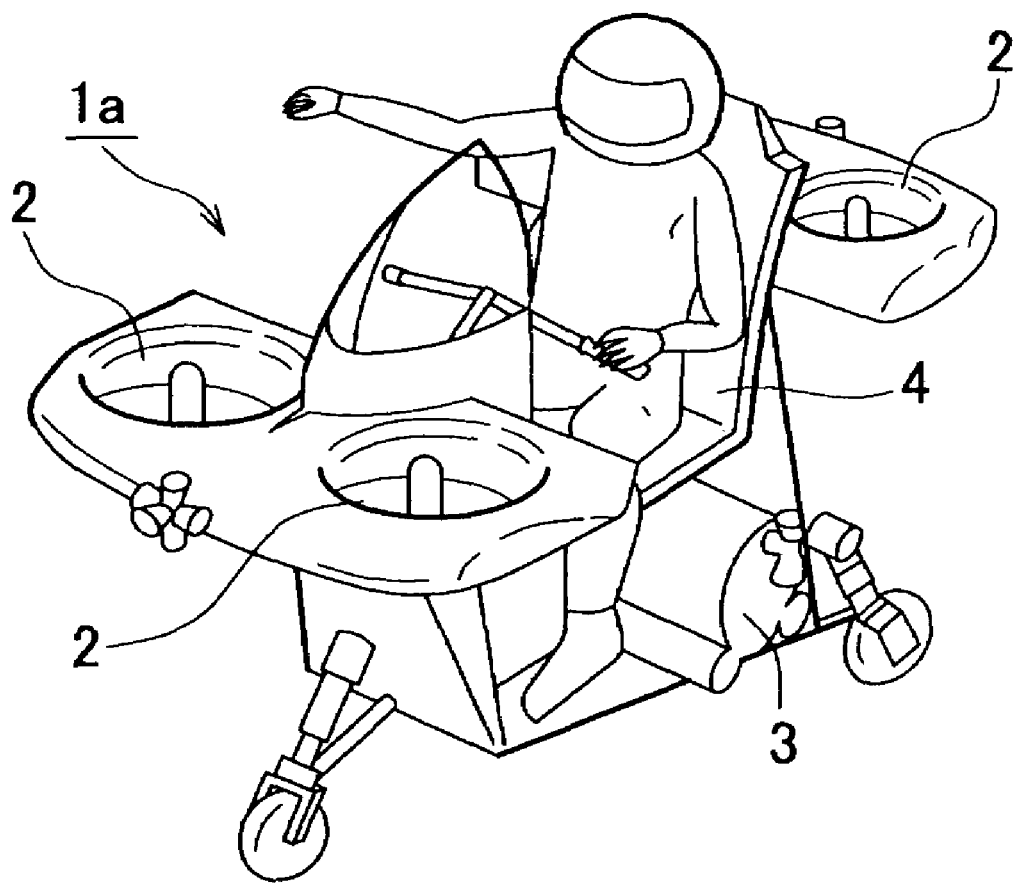
FIG. 3 is the perspective view schematically showing the structure of a vertical take-off and landing aircraft according to embodiments of the invention.
Figure 4:
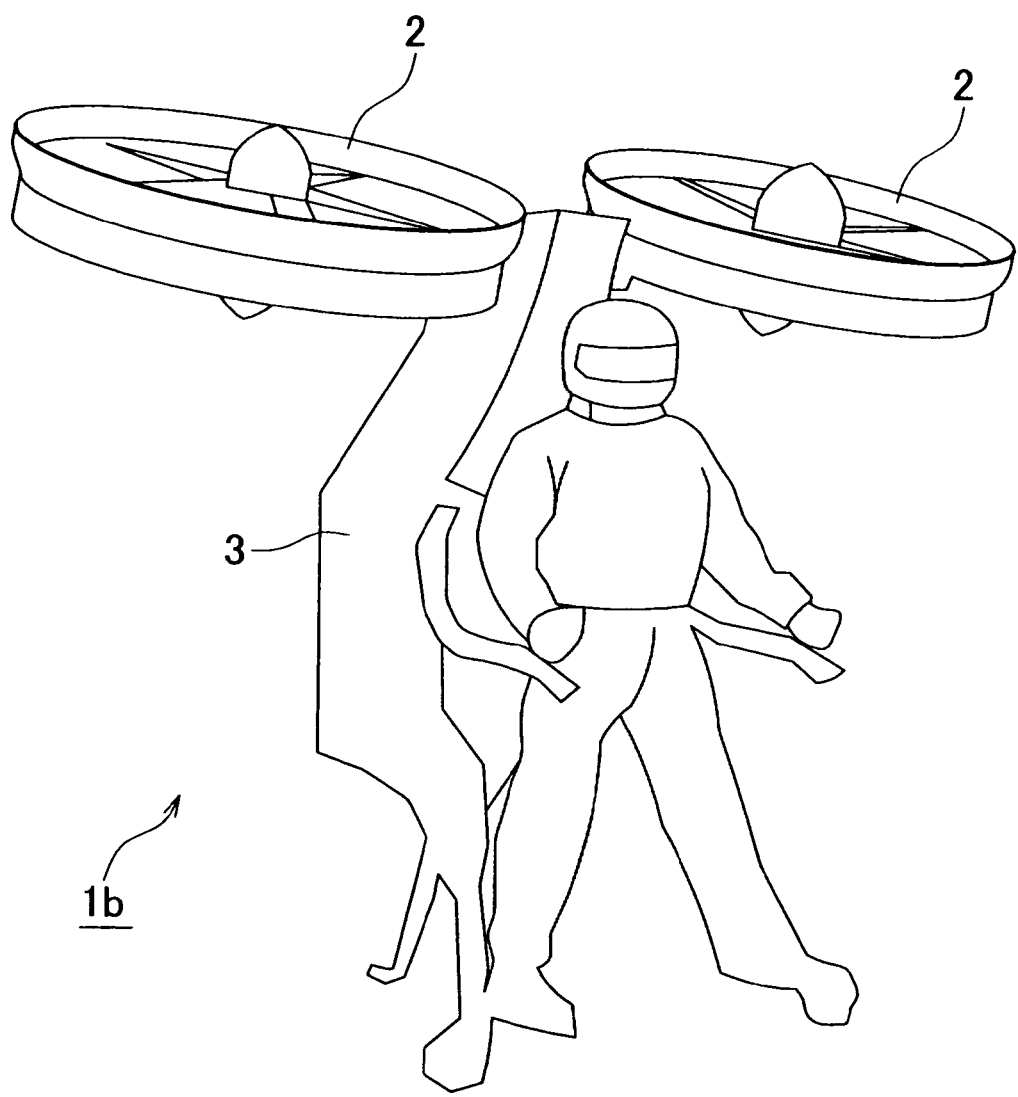
FIG. 4 is the perspective view schematically showing the structure of another vertical take-off and landing aircraft according to the embodiments of the invention.

FIG. 3 is the perspective view showing a vertical take-off and landing aircraft according to the embodiments of the invention. A vertical take-off and landing aircraft 1a shown in FIG. 3 is provided with four ducted fans 2. Two of the four ducted fans 2 are provided to the front of an operator, and the other two ducted fans 2 are provided to the rear of the operator FIG. 4 is the perspective view showing another vertical take-off and landing aircraft according to the embodiments of the invention. An operator can operate a vertical take-off and landing aircraft 1b shown in FIG. 4 in a substantially upright posture. The vertical take-off and landing aircraft is provided with two ducted fans 2. One of the ducted fans 2 is provided to the right of and above the operator, and the other ducted fan 2 is provided to the left of and above the operator.

Figure 5:
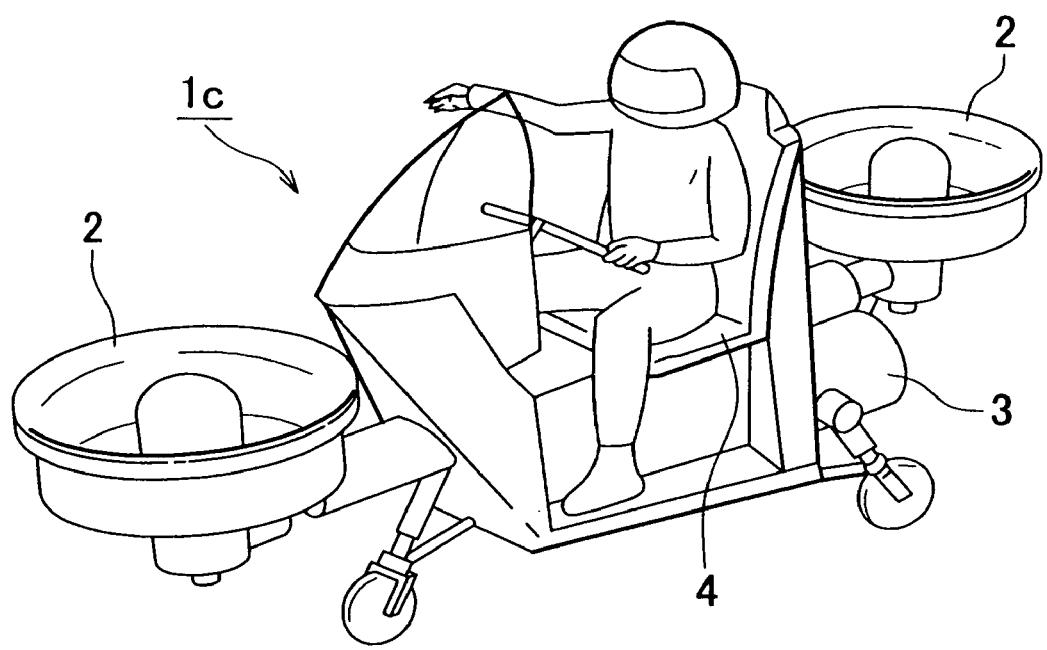
FIG. 5 is the perspective view schematically showing the structure of another vertical take-off and landing aircraft according to the embodiments of the invention.

FIG. 5 is the perspective view showing another vertical take-off and landing aircraft according to the embodiments of the invention. A vertical take-off and landing aircraft 1c shown in FIG. 5 is provided with two ducted fans 2. One of the ducted fans 2 is provided to the front of an operator, and the other ducted fan 2 is provided to the rear of the operator.

An occupant seat 4 for the operator is provided at the center of each of the vertical take-off and landing aircrafts 1a and 1c. A drive source 3 may be arranged below the occupant seat 4 in each of the vertical take-off and landing aircraft 1a and 1c. In the vertical take-off and landing aircraft 1b, the drive source 3 is arranged behind the operator.

In the embodiments described below, the invention is applied to two types of ducted fans that are driven in different manners.

The two types of ducted fans includes a ducted fan in which a fan is turned by a driving force from, for example, a motor and a ducted fan in which a fan connected to a tip turbine fan is turned by driving the tip turbine fan housed in a duct using compressed air (hereinafter, such ducted fan will be referred to as a "tip turbine-driven ducted fan").

In a first embodiment, the invention is applied to the ducted fan in which the fan is turned using the driving force from, for example, the motor. In a second embodiment, the invention is applied to the ducted fan in which the fan connected to the tip turbine fan is turned by driving the tip turbine fan housed in the duct using the compressed air.

Figure 6:
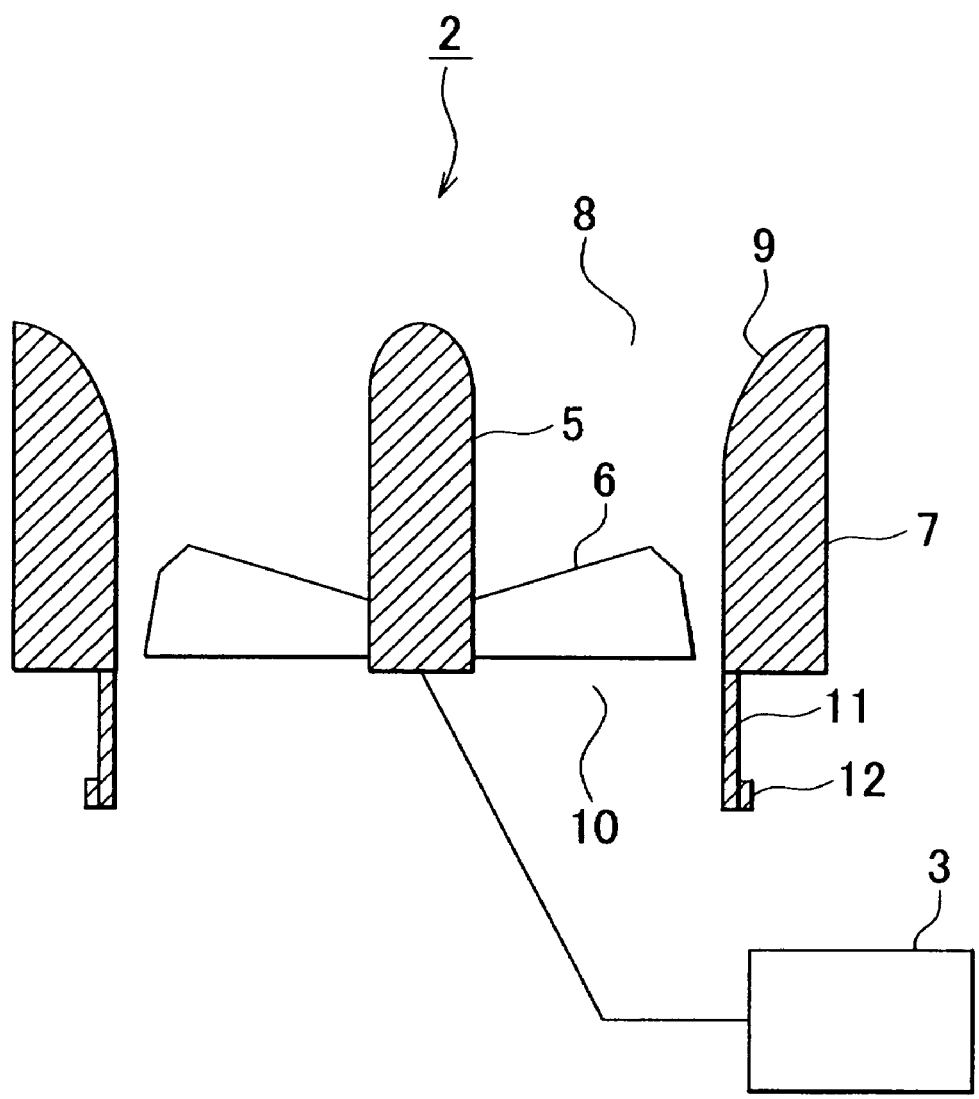
FIG. 6 is the cross-sectional view schematically showing the structure of a ducted fan according to a first embodiment of the invention.

FIG. 6 is the cross-sectional view of the ducted fan 2 according to the first embodiment of the invention, taken along the plane including the central axis of the ducted fan 2. FIG. 6 schematically shows the structure of the ducted fan 2.

The ducted fan 2 includes a main shaft 5 that rotates at a high speed using the driving force supplied from the drive source 3; a fan 6 connected to the main shaft 5; and a cylindrical duct 7 arranged around the main shaft 5 and the fan 6.

An airflow inlet 8, through which air is introduced into the duct 7, is defined by the inner face of the upstream end of the duct 7. A ramp portion 9 is formed in the inner face of the upstream end of the duct 7. A rounding process (R-process) is performed on the ramp portion 9 to form a smoothly curved surface. Thus, the ramp portion 9 is contiguous smoothly to the inner face of the duct 7.

When the ducted fan 2 is driven, the fan 6 turns at a high speed to generate airflow. The airflow goes into the duct 7 through the airflow inlet 8, and comes out of an airflow outlet 10 defined by the inner face of the downstream end of the duct 7. A thrust is produced by a reaction force, which is produced when the airflow comes out of the airflow outlet 10.

When the airflow goes into the duct 7 through the airflow inlet 8, the flow speed of the airflow increases at the ramp portion 9, whereby a negative pressure is formed on the surface of the ramp portion 9. Thus, a force for attracting the ramp portion 9 is applied in the direction in which the negative pressure is applied. This force forms part of the thrust.

In the first embodiment of the invention, a cylindrical airflow guide portion 11 is provided at the airflow outlet 10. The outer diameter of the airflow guide portion 11 is smaller than the outer diameter of the duct 7. The airflow guide portion 11 is arranged such that the inner face of the airflow guide portion 11 is contiguous smoothly to the inner face of the duct 7. The airflow guide portion 11 has an inner diameter substantially equal to an inner diameter of the duct 7. A negative-pressure forming portion 12 is provided at the downstream end of the airflow guide portion 11. The negative-pressure forming portion 12 is an annular projection that forms a flange at the downstream end of the airflow guide portion 11.

Figure 7:
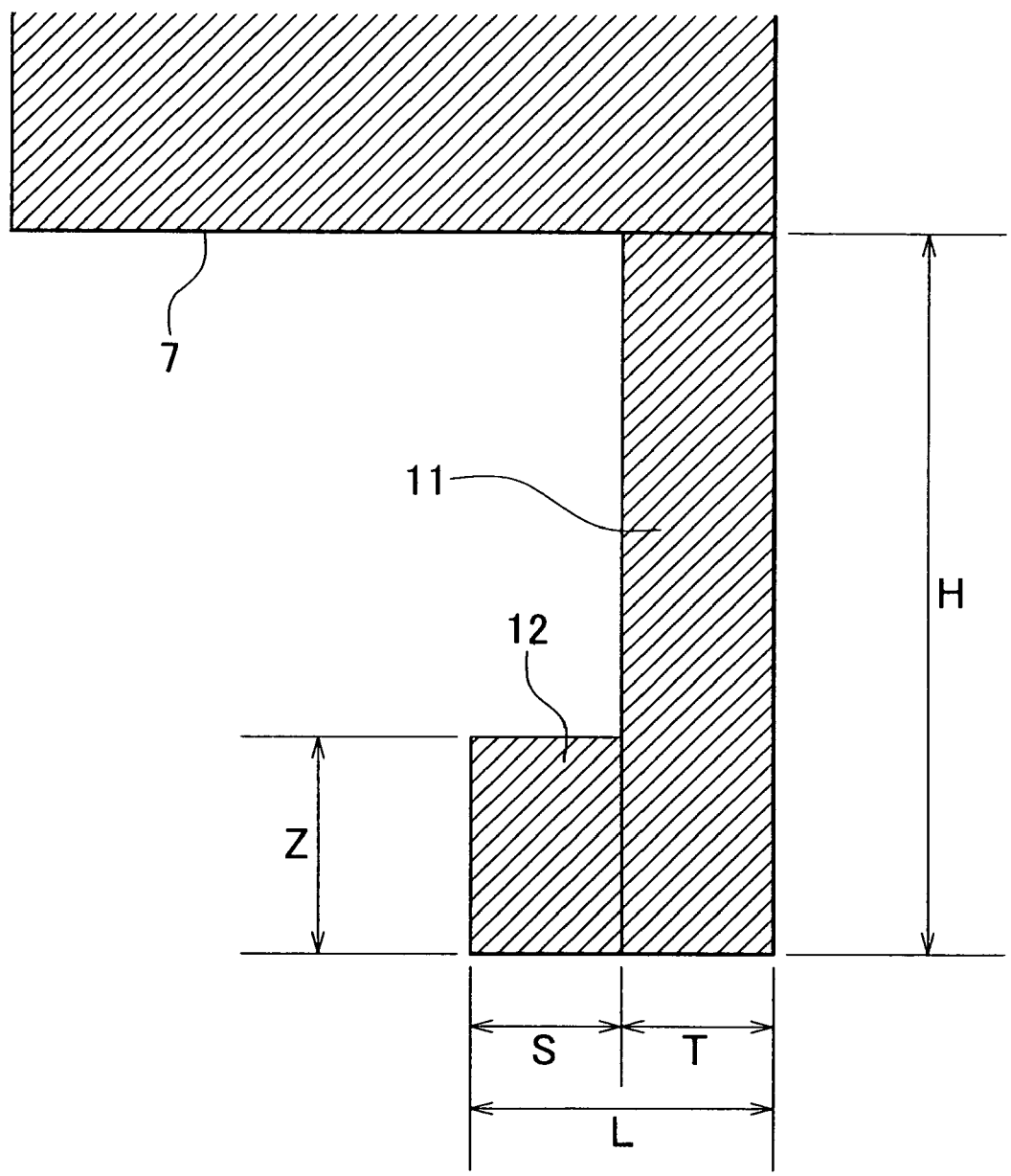
FIG. 7 is the enlarged view showing an airflow guide portion and a negative-pressure forming portion of the ducted fan according to the first embodiment of the invention.

FIG. 7 is the enlarged view showing the airflow guide portion 11 and the negative-pressure forming portion 12 of the ducted fan 2.

The reference character "H" in FIG. 7 denotes the length of the airflow guide portion 11 in the axial direction thereof (hereinafter, simply referred to as the "length H of the airflow guide portion 11"). The reference character "T" denotes the thickness of the airflow guide portion 11 in the radial direction thereof (hereinafter, simply referred to as the "thickness T of the airflow guide portion 11"). The reference character "Z" denotes the length of the negative-pressure forming portion 12 in the axial direction thereof (hereinafter, simply referred to as the "length Z of the negative-pressure forming portion 12"). The reference character "L" denotes the thickness of the portion of the airflow guide portion 11, to which the negative-pressure forming portion 12 is provided, in the radial direction (hereinafter, simply referred to as the "thickness L of the negative-pressure forming portion 12"). The reference character "S" denotes the difference between the thickness L of the negative-pressure forming portion 12 and the thickness T of the airflow guide portion 11 (L–T) (hereinafter, referred to as the "height S of the negative-pressure forming portion 12").

In the first embodiment of the invention, the length H of the airflow guide portion 11 is equal to or greater than 10% of the inner diameter of the duct 7. The thickness T of the airflow guide portion 11 is equal to or greater than 1% of the inner diameter of the duct 7. The thickness L of the negative-pressure forming portion 12 is equal to or greater than 10% of the length H of the airflow guide portion 11. The length Z of the negative-pressure forming portion 12 is substantially equal to the thickness L of the negative-pressure forming portion 12.

Next, a description will be given, with reference to FIGS. 8 to 10, concerning the phenomenon that occurs when a crosswind blows against the side face of the ducted fan 2 according to the first embodiment of the invention from the outside of the ducted fan 2.

FIG. 8 shows the airflows generated around the ducted fan 2 and in the duct 7, when a crosswind 13 blows against the side face of the ducted fan 2 according to the first embodiment of the invention from the outside of the ducted fan 2. The arrowed lines in FIG. 8 indicate the directions of the airflows. To facilitate the understanding of the directions of the airflows, the fun 6 is not shown in FIG. 8.

Figure 1:
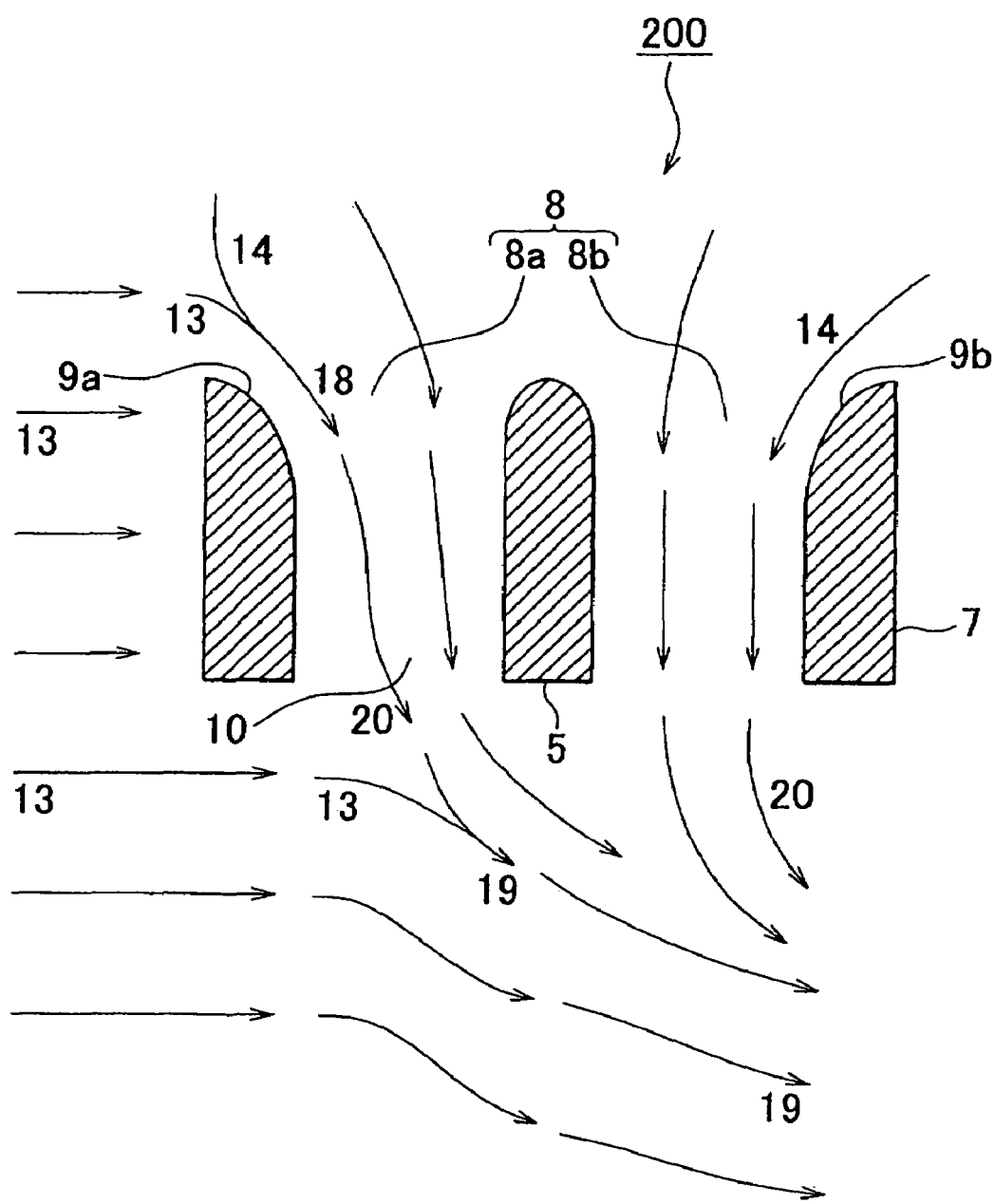
FIG. 1 is the view showing airflows generated around a ducted fan and in a duct according to a related art.

As shown in FIG. 8, there is not much difference in the airflows generated near the airflow inlet 8 between the ducted fan 2 according to the first embodiment of the invention and a ducted fan 200 according to the related art shown in FIG. 1.

FIG. 8 also shows the airflows near the airflow outlet 10. As shown in FIG. 8, a crosswind 26 blowing against the portion near the airflow guide portion 11 is introduced to the downstream end of the airflow guide portion 11.

According to the first embodiment of the invention, the length H of the airflow guide portion 11 is equal to or greater than 10% of the inner diameter of the duct 7. Accordingly, the crosswind 26 blowing against the portion near the airflow guide portion 11 is appropriately guided to the downstream end of the airflow guide portion 11.

The crosswind 26, which has been guided to the downstream end of the airflow guide portion 11, passes by the negative-pressure forming portion 12, whereby the direction of the airflow changes. An arrow 24 in FIG. 8 indicates how the direction of the crosswind 26 changes by passing by the negative-pressure forming portion 12.

Such a change in the direction of the crosswind 26 forms a negative pressure area 27 near the downstream end of the negative-pressure forming portion 12.

In the first embodiment of the invention, the thickness L of the negative-pressure forming portion 12 is equal to or greater than 10% of the length H of the airflow guide portion 11. Accordingly, the height S of the negative-pressure forming portion 12 is greater than the thickness of a boundary layer, which is formed on an outer face 49 of the airflow guide portion 11 due to the crosswind 26 flowing along the airflow guide portion 11. Therefore, the negative pressure area 27 is appropriately formed when the crosswind 26 passes by the negative-pressure forming portion 12.

Figure 9:
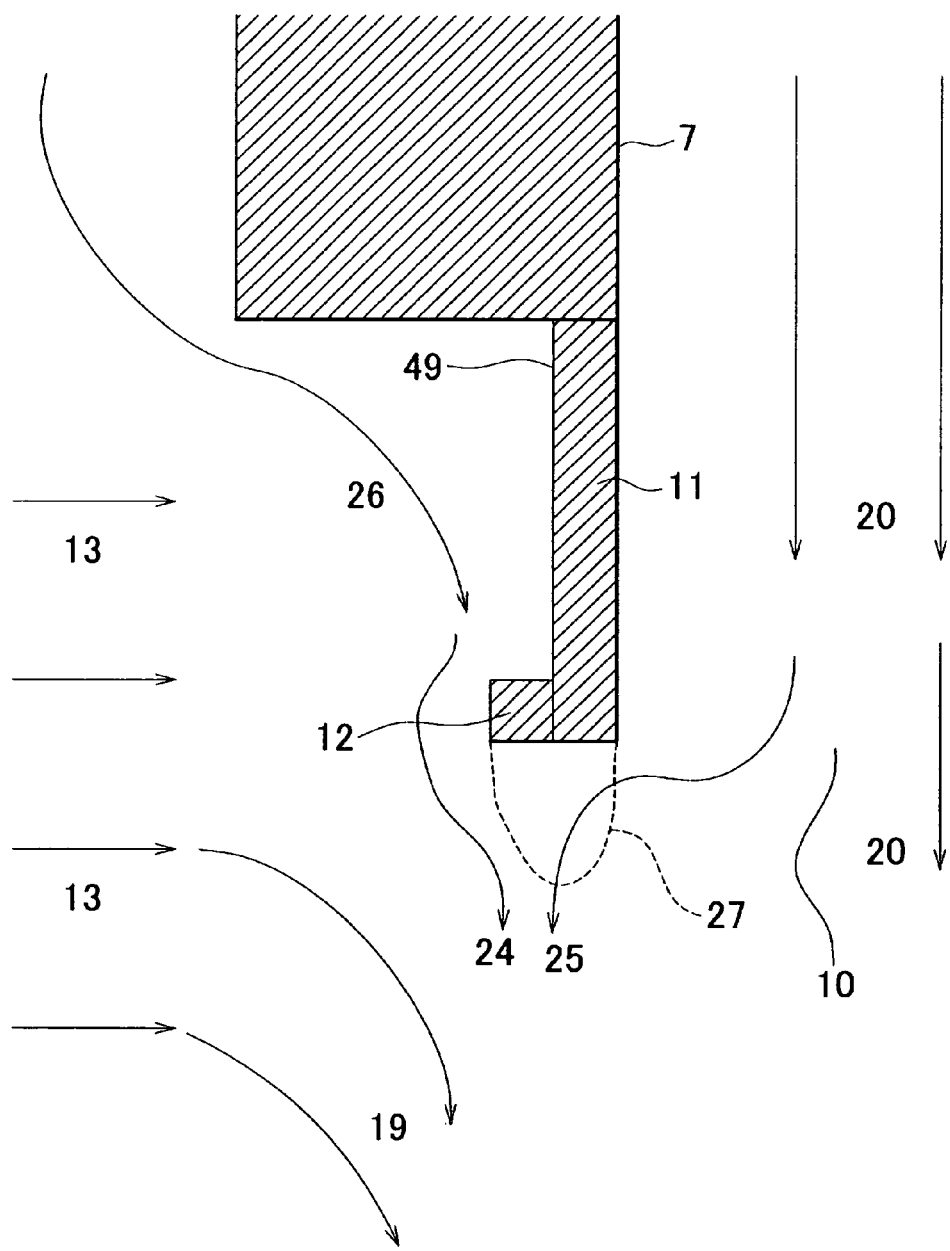
FIG. 9 is the enlarged view showing the area near the airflow guide portion and the negative-pressure forming portion of the ducted fan according to the first embodiment of the invention.

FIG. 9 is the enlarged view showing the area near the airflow guide portion 11 and the negative-pressure forming portion 12.

Part of the airflow 20 coming out of the duct 7 is guided in the direction in which the negative pressure area 27 formed. Especially, if an airflow 25, which proceeds along the inner face of the portion of the duct 7, the portion being exposed to the crosswind 13 (hereinafter, referred to as the "front portion of the duct 7"), is guided in the direction in which the negative pressure is applied, the direction of an airflow 19 below the duct 7 (hereinafter, referred to as a "descending airflow") does not easily approach the direction of the crosswind 13.

Accordingly, proceeding of the descending airflow 19 through the area downstream of the airflow outlet 10 of the duct 7 so as to pass over the airflow outlet is suppressed. As a result, the flow path, along which the airflow coming vertically out of the airflow outlet 10 of the duct 7, is not easily interrupted.

Thus, the air flows out of the duct 7 more smoothly, and decreases in the flow speed of the airflow 20 coming out of the duct 7 are suppressed.

Figure 10:
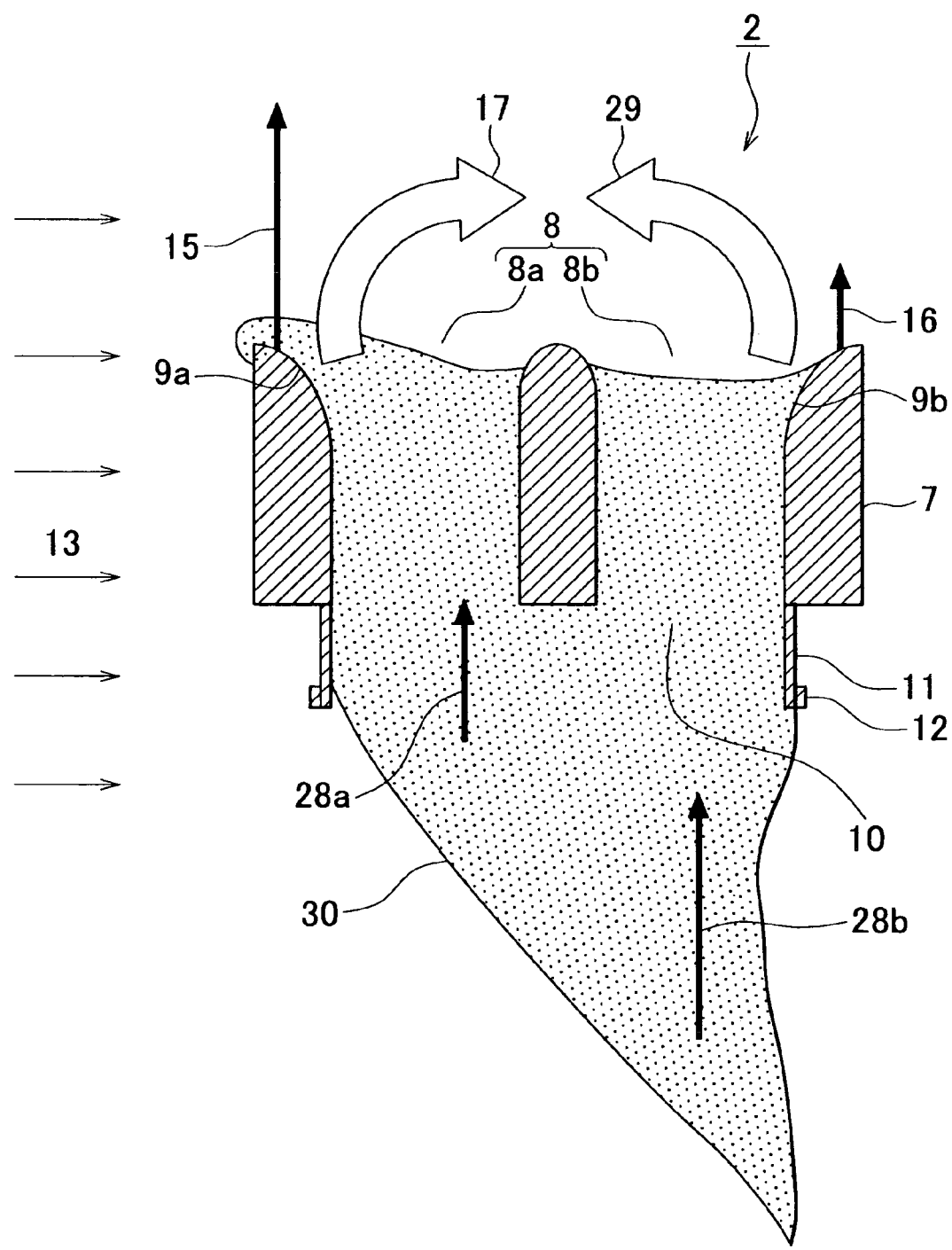
FIG. 10 is the view showing the flow speed distribution of the airflows, the thrust and the moments produced around the ducted fan and in the duct according to the first embodiment of the invention.

FIG. 10 shows the flow speed distribution of the airflows generated around the ducted fan 2 and in the duct 7, the directions and magnitudes of the thrusts produced by the airflows, and the directions and the magnitudes of the moment produced by the thrusts, in the case where the crosswind 13 blows against the side face of the ducted fan 2 according to the first embodiment of the invention from the outside of the ducted fan 2.

As described above, there is not much difference in the airflows generated near the airflow inlet 8 between the ducted fan 2 according to the first embodiment of the invention and the ducted fan 200 according to the related art shown in FIG. 1. Accordingly, the negative pressure formed at a ramp portion 9a, which is formed in the inner face of the front portion of the duct 7 (hereinafter, referred to as a "front ramp portion 9a") is greater than the negative pressure formed at a ramp portion 9b, which is formed in the inner face of the portion (the rear portion) of the duct 7, the rear portion not being exposed to the crosswind (hereinafter, referred to as a "rear ramp portion 9b"). Accordingly, a force 15 for attracting the front ramp portion 9a is stronger than a force 16 for attracting the rear ramp portion 9b, whereby the front ramp portion 9a is attracted in the direction, in which the negative pressure is applied, more strongly than the rear ramp portion 9b is. Thus, a moment 17, which is applied in the direction in which the front ramp portion 9a moves upward, is produced.

In the duct 7 and on the downstream end of the duct 7, a flow distribution area 30 is formed. In the flow distribution area 30, the airflow proceeds at a flow speed equal to or higher than a predetermined value.

Figure 2:
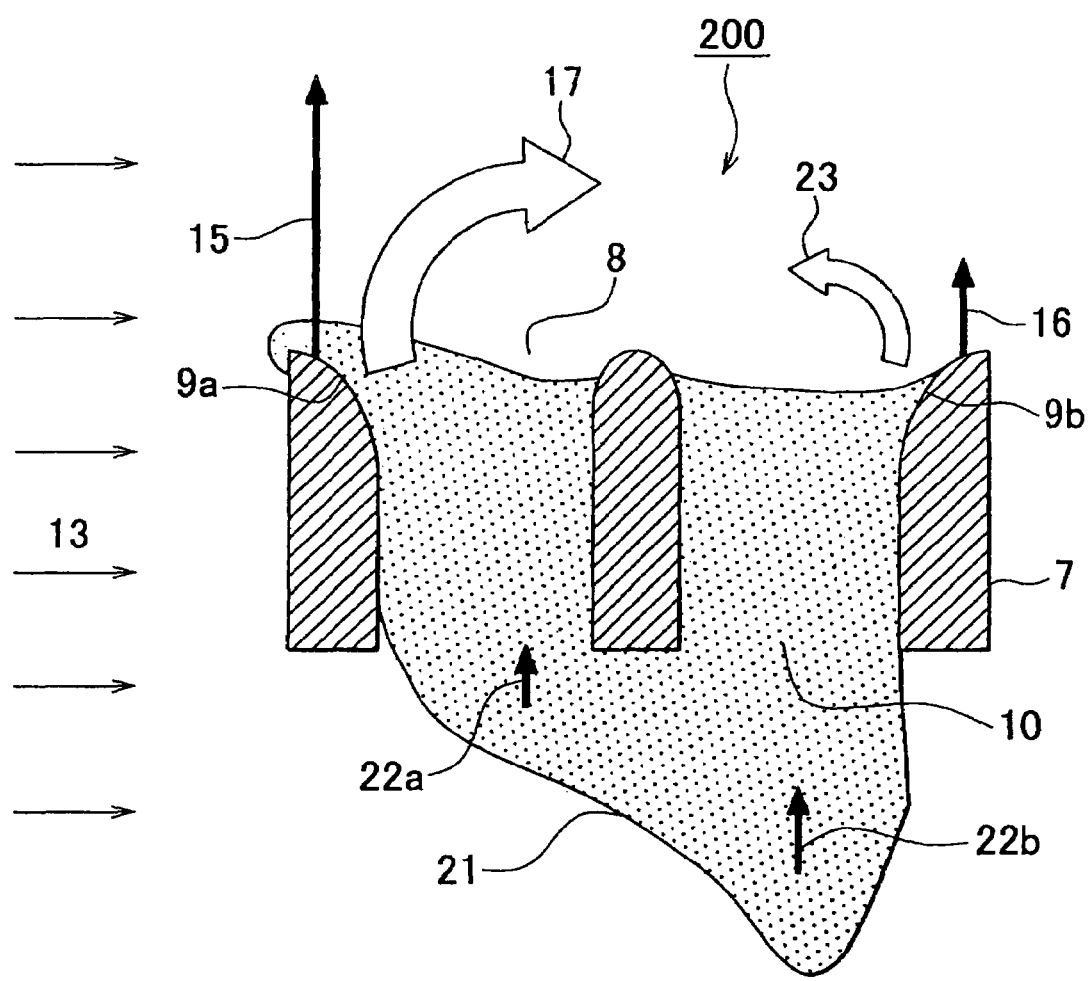
FIG. 2 is the view showing the flow speed distribution, the thrusts, and the moments produced around the ducted fan and in the duct according to the related art.

A comparison between the flow distribution 21 in FIG. 2 and the flow distribution 30 in FIG. 10 shows that the flow distribution area, in which the airflow coming out of the duct 7 proceeds at a flow speed equal to or higher than the predetermined flow speed of the ducted fan 2 according to the first embodiment of the invention is greater than that of the ducted fan 200 according to the related art.

Thus, the thrust 28a that is applied to the front portion of the duct 7 (hereinafter, referred to as a "front fan thrust 28a") and the thrust 28b that is applied to the rear portion of the duct 7 (hereinafter, referred to as a "rear fan thrust 28b") are greater than the front fan thrust 22a and the rear fan thrust 22b in the ducted fan 200 according to the related art, respectively.

Especially, the rear fan thrust 28b in the first embodiment of the invention is greater than the rear fan thrust 22b in the related art, whereby a moment 29 that is applied in the direction in which the rear portion of the duct 7 moves upward is greater than a moment 23 that is applied in the direction in which the rear portion of the duct 7 in the related art moves upward.

The moment that is produced when the ducted fan 2 according to the first embodiment of the invention is exposed to the crosswind is the combination of the moment 17, which is applied in the direction in which the front ramp portion 9a moves upward, and the moment 29, which is produced when the air flows out of the duct 7 and which is applied in the direction in which the rear portion of the duct 7 moves upward.

As described above, the moment 29, which is applied in the direction in which the rear portion of the duct 7 moves upward, is greater than the moment 23, which is applied in the direction in which the rear portion of the duct 7 according to the related art. As a result, the moment, which is applied in the direction in which the front portion of the ducted fan 2 moves upward (hereinafter, such moment will be referred to as the "pitch-up moment"), is less the moment, which is applied in the direction in which the front portion of the ducted fan 200 according to the related art moves upward.

Next, a second embodiment of the invention will be described in detail. The second embodiment is different from the first embodiment in that a tip turbine-driven ducted fan is used instead of the ducted fan 2.

Figure 11:
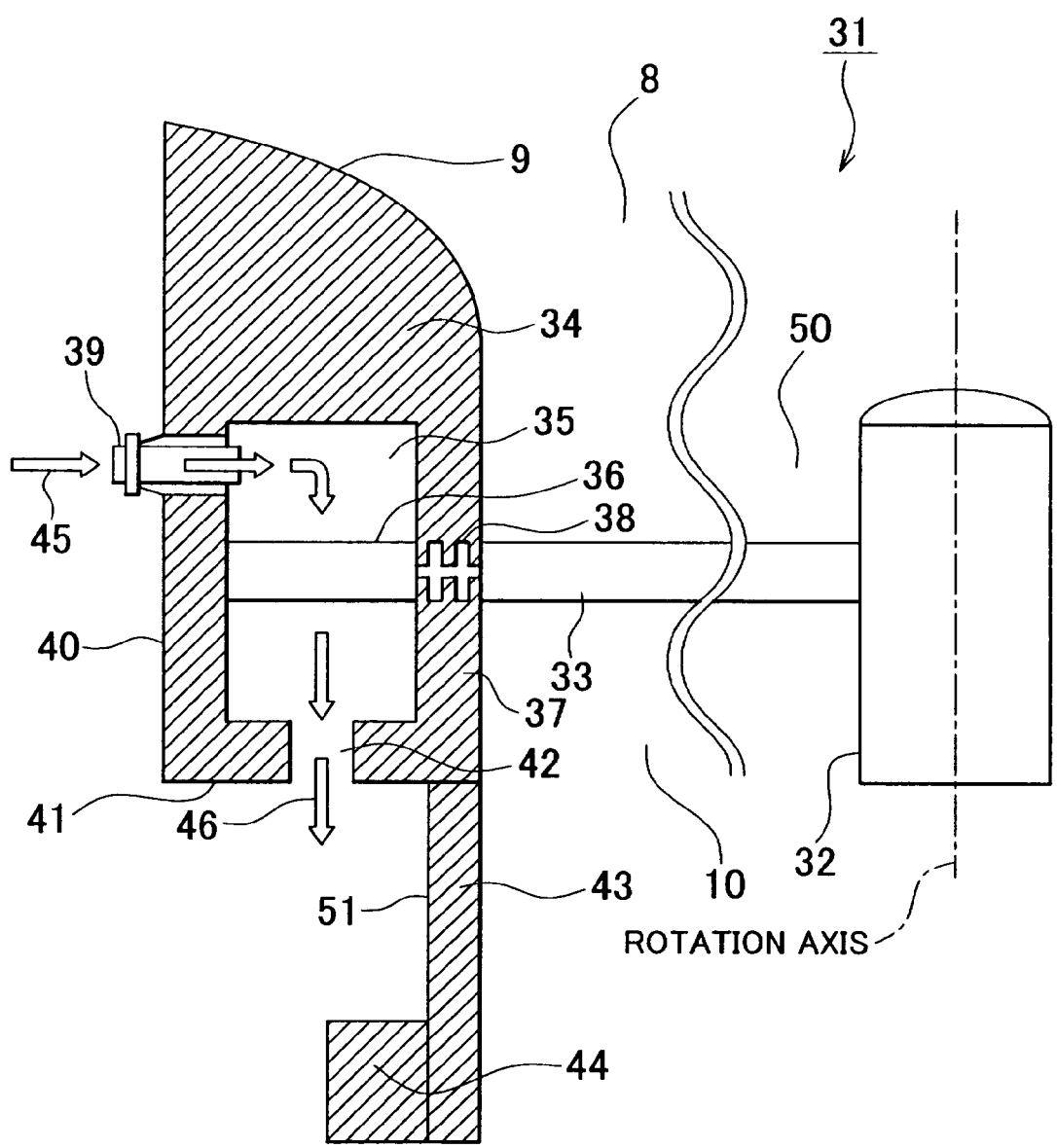
FIG. 11 is the cross-sectional view schematically showing the structure of a tip turbine-driven ducted fan according to a second embodiment of the invention.

FIG. 11 is the partial cross sectional view of a tip turbine-driven ducted fan 31, taken along the plane including the central axis of the tip turbine-driven ducted fan 31. FIG. 11 schematically shows the structure of the tip turbine-driven ducted fan 31.

The tip turbine-driven ducted fan 31 is formed by connecting a fan 33, which rotates about a main shaft 32, to a tip turbine fan 36, which is housed in an annular turbine chamber 35 and which is formed in a duct 34, via a labyrinth portion 38 formed in an inner wall 37 of the duct 34.

A compressed air 45, which is supplied from a compressed air supply source (not shown), is supplied to the turbine chamber 35 via a compressed air inlet 39. When the compressed air blows against the tip turbine fan 36 housed in the turbine chamber 35, a lifting force is produced in the tip turbine fan 36, whereby the tip turbine fan 36 turns, and the fan 33 connected to the tip turbine fan 36 also turns.

The labyrinth portion 38 has a seal structure that suppresses a leak of the compressed air flowing in the turbine chamber 35 to an inside 50 of the duct.

In the second embodiment of the invention, the compressed air inlet 39, through which the compressed air is taken in the turbine chamber 35, is formed in an outer wall 40 of the duct 34. Compressed air 46, which has blown against the tip turbine fan 36, is discharged to the outside of the turbine chamber 35 through a compressed air outlet 42 formed in a downstream end 41 of the duct 34.

Multiple compressed air inlets 39 and multiple compressed air outlets 42 are formed at regular intervals in the circumferential direction of the duct. In the second embodiment of the invention, four pairs of the compressed air inlet 39 and the compressed air outlet 42 may be formed.

The airflow inlet 8, through which air is introduced into the duct 34, is defined by the inner face of the upstream end of the duct 34. The ramp portion 9 is formed in the inner face of the upstream end of the duct 34. The R-process is also performed on the ramp portion 9 of this embodiment to form a smoothly curved surface. Thus, the ramp portion 9 is contiguous smoothly to the inner face of the duct 34.

When the tip turbine-driven ducted fan 31 is driven by the compressed air supplied from the compressed air supply source to the turbine chamber 35, the fan turns at a high speed, and the airflow going from the airflow inlet 8 into the duct 34 is generated. The airflow comes out of the airflow outlet 10, which is defined by the inner face of the downstream end of the duct 34. Then, a thrust is produced by a reaction force, which is produced when the airflow comes of the airflow outlet 10.

When the airflow goes from the airflow inlet 8 into the duct 34, the flow speed of the airflow increases at the ramp portion 9, and a negative pressure is formed on the surface of the ramp portion 9. A force for attracting the ramp portion 9 is applied in the direction in which the negative pressure is applied. This force forms part of the thrust.

In the second embodiment of the invention, a cylindrical airflow guide portion 43 is formed at the airflow outlet 10. The outer diameter of the airflow guide portion 43 is smaller than the outer diameter of the duct 34. The inner face of the airflow guide portion 43 is contiguous to the inner face of the duct 34. A negative-pressure forming portion 44 is formed at the downstream end of the airflow guide portion 43. The negative-pressure forming portion 44 is an annular projection that forms a flange at the downstream end of the airflow guide portion 43.

Figure 12:
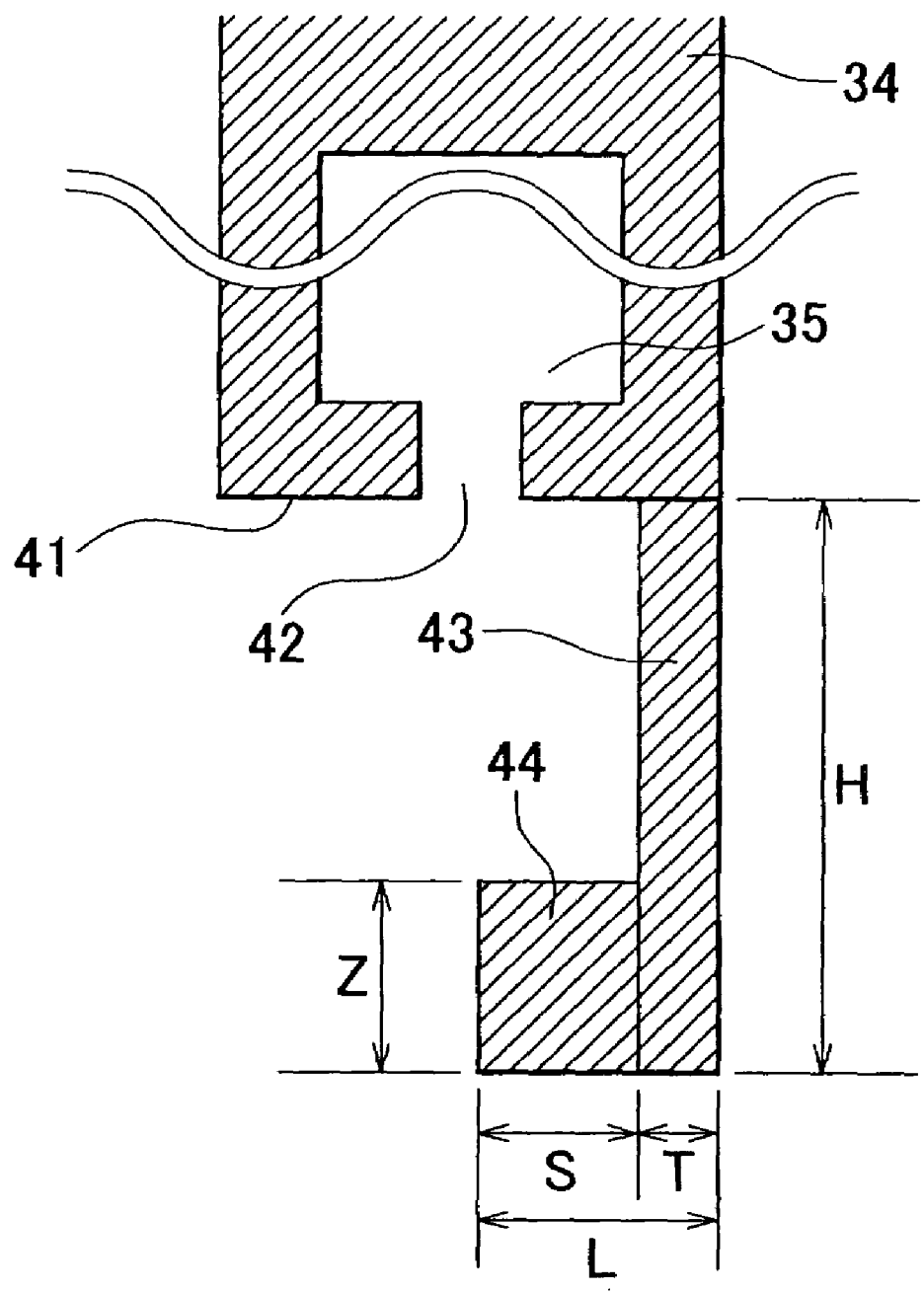
FIG. 12 is the enlarged view showing an airflow guide portion and a negative-pressure forming portion of the tip turbine-driven ducted fan according to the second embodiment of the invention.

FIG. 12 is the enlarged view of the airflow guide portion 43 and the negative-pressure forming portion 44 of the tip turbine-driven ducted fan 31.

The reference character "H" in FIG. 12 denotes the length of the airflow guide portion 43 in the axial direction thereof (hereinafter, simply referred to as the "length H of the airflow guide portion 43"). The reference character "T" denotes the thickness of the airflow guide portion 43 in the radial direction thereof (hereinafter, referred to as the "thickness T of the airflow guide portion 43"). The reference character "Z" denotes the length of the negative-pressure forming portion 44 in the axial direction (hereinafter, referred to as the "length Z of the negative-pressure forming portion 44"). The reference character "L" denotes the thickness of the portion of the airflow guide portion 43, to which the negative-pressure forming portion 44 is provided, in the radial direction (hereinafter, simply referred to as the "thickness L of the negative-pressure forming portion 44"). The reference character "S" denotes the difference between the thickness L of the negative-pressure forming portion 44 and the thickness T of the airflow guide portion 43 (L−T) (hereinafter, referred to as the "height S of the negative-pressure forming portion 44").

In the second embodiment of the invention, the length H of the airflow guide portion 43 is equal to or greater than 10% of the inner diameter of the duct 34. The thickness T of the airflow guide portion 43 is equal to or greater than 1% of the inner diameter of the duct 34. The thickness L of the negative-pressure forming portion 44 is equal to or greater than 50% of the length H of the airflow guide portion 43. The length Z of the negative-pressure forming portion 44 is substantially equal to the thickness L of the negative-pressure forming portion 44.

Provision of the airflow guide portion 43 and the negative-pressure forming portion 44 to the duct 34 produces the effects specific to the invention. Such effects are obtained when a crosswind blows against the side face of the tip turbine-driven ducted fan 31 from the outside of the tip turbine-driven ducted fan 31. Those effects are the same as those obtained in the first embodiment of the invention described above.

Accordingly, only the effects produced by applying the invention to the tip turbine-driven ducted fan 31 will be described below.

Figure 13:
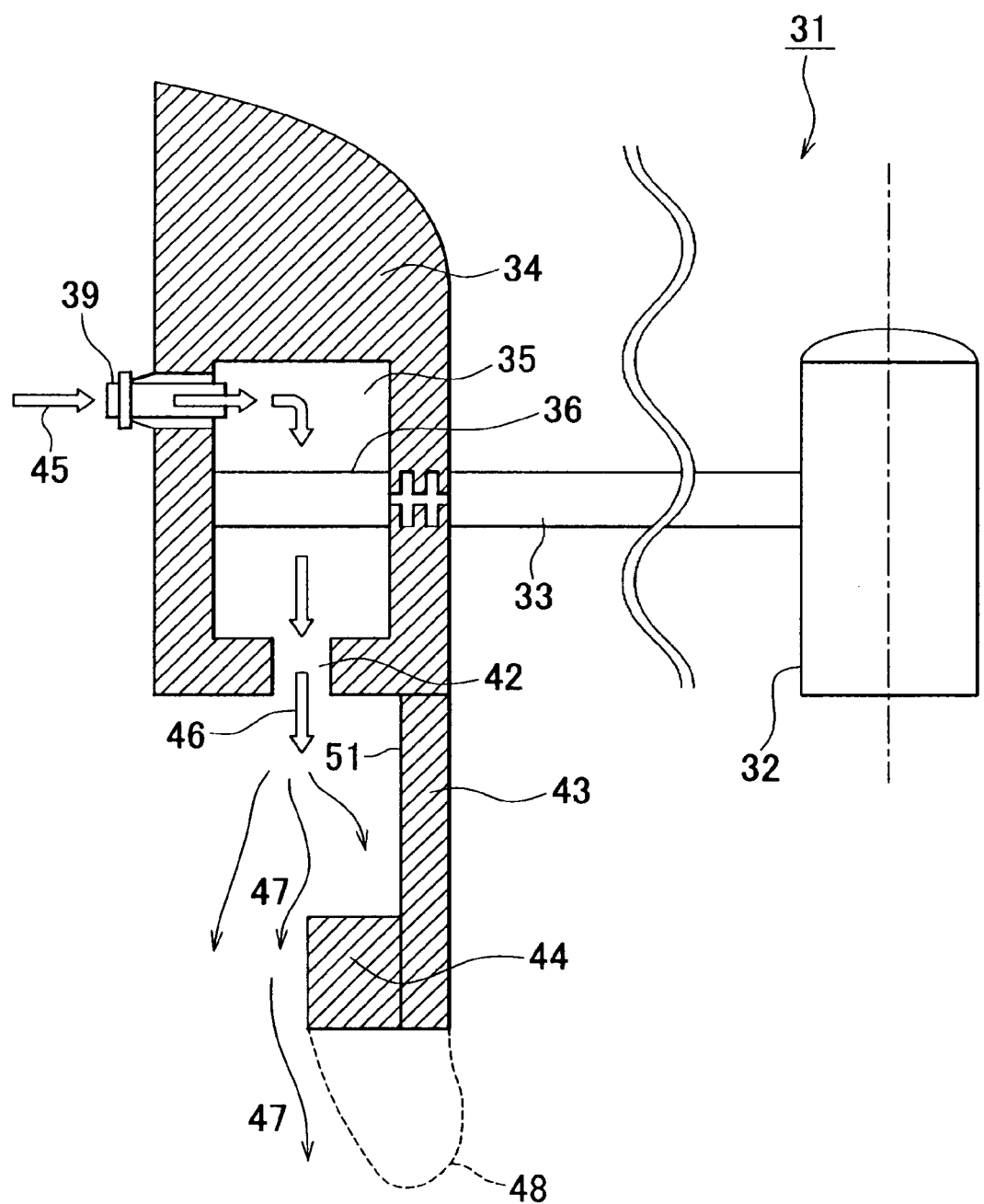
FIG. 13 is the view showing the flow of the compressed air that drives the tip turbine-driven ducted fan according to the second embodiment of the invention.

FIG. 13 illustrates the flows of the compressed air that drives the tip turbine-driven ducted fan 31.

The compressed air 45 flowing from the compressed air inlet 39 into the turbine chamber 35 blows against the tip turbine fan 36 to drive the tip turbine fan 36. Thus, the energy of the compressed air 45 is converted into the turning motion of the fan 33 connected to the tip turbine fan 36.

At this time, approximately 80% of the energy of the compressed air 45 is consumed to turn the fan 33. The compressed air 46 left with approximately 20% of the energy is discharged from the compressed air outlet 42.

In the second embodiment of the invention, the thickness L of the negative-pressure forming portion 44 is equal to or greater than 50% of the length H of the airflow guide portion 43. Accordingly, the height S of the negative-pressure forming portion 44 is greater than the thickness of a boundary layer, which is formed on an outer face 51 of the airflow guide portion 43 by a compressed air 47 flowing along the airflow guide portion 43.

Accordingly, the compressed air 47, which flows at a position apart from the outer face 51 of the airflow guide portion 43 by a distance greater than the thickness of the boundary layer and of which the flow speed decreases gradually, passes by the negative-pressure forming portion 44.

Thus, a negative pressure area 48 is appropriately formed near the downstream end of the negative-pressure forming portion 44, when the direction of the flow of the compressed air 47 is changed at the negative-pressure forming portion 44.

The flow speed of the compressed air 46 discharged from the compressed air outlet 42 may be higher than the flow speed of the crosswind 26 that is introduced to the negative-pressure forming portion 12 by the airflow guide portion 11 in the first embodiment of the invention. Accordingly, the magnitude of the negative pressure area 48 formed may be greater than that of the negative pressure formed in the area 27 near the downstream end of the negative-pressure forming portion 12 in the first embodiment of the invention.

This negative pressure produces the same effect as the effect of decreasing the pitch-up moment, which is produced by the negative pressure formed when the crosswind 26 passes by the negative-pressure forming portion 12 in the first embodiment. According to the second embodiment, it is possible to more reliably decrease the pitch-up moment produced when the crosswind blows against the tip turbine-driven ducted fan 31.

According to the second embodiment of the invention, even when the ducted fan 31 is not exposed to the crosswind 13, the negative pressure area 48 is formed while the compressed air 46 is discharged from the compressed air outlet 42. This increases the thrust of the tip turbine-driven ducted fan 31 by the negative pressure while the ducted fan 31 is not exposed to the crosswind.

While the invention has been described with reference to example embodiments thereof, it is to be understood that the invention is not limited to the example embodiments or constructions. To the contrary, the invention is intended to cover various modifications and equivalent arrangements within the spirit and scope of the invention.

For example, in the second embodiment of the invention, the thickness L of the negative-pressure forming portion 44 is greater than that in the first embodiment of the invention. This is because the direction of the flow of the compressed air 46 is changed more reliably when the compressed air 46 discharged from the compressed air outlet 42 passes by the negative-pressure forming portion 44.

In the second embodiment of the invention, the length Z of the negative-pressure forming portion is substantially equal to the thickness L of the negative-pressure forming portion. The length Z in the second embodiment is greater than that in the first embodiment. The high-temperature and high-pressure compressed air 46, which is discharged from the compressed air outlet 42 at a high speed, blows against the negative-pressure forming portion 44. Accordingly, the strength of the negative-pressure forming portion in the second embodiment needs to be higher than that in the first embodiment.

The thickness L and the length Z of the negative-pressure forming portion in the second embodiment are greater than those in the first embodiment to have the compressed air 46 more appropriately pass by the negative-pressure forming portion 44. Accordingly, the thickness L and the length Z of the negative-pressure forming portion other than the portion by which the compressed air passes need not be greater than those in the first embodiment of the invention.

Figure 14:
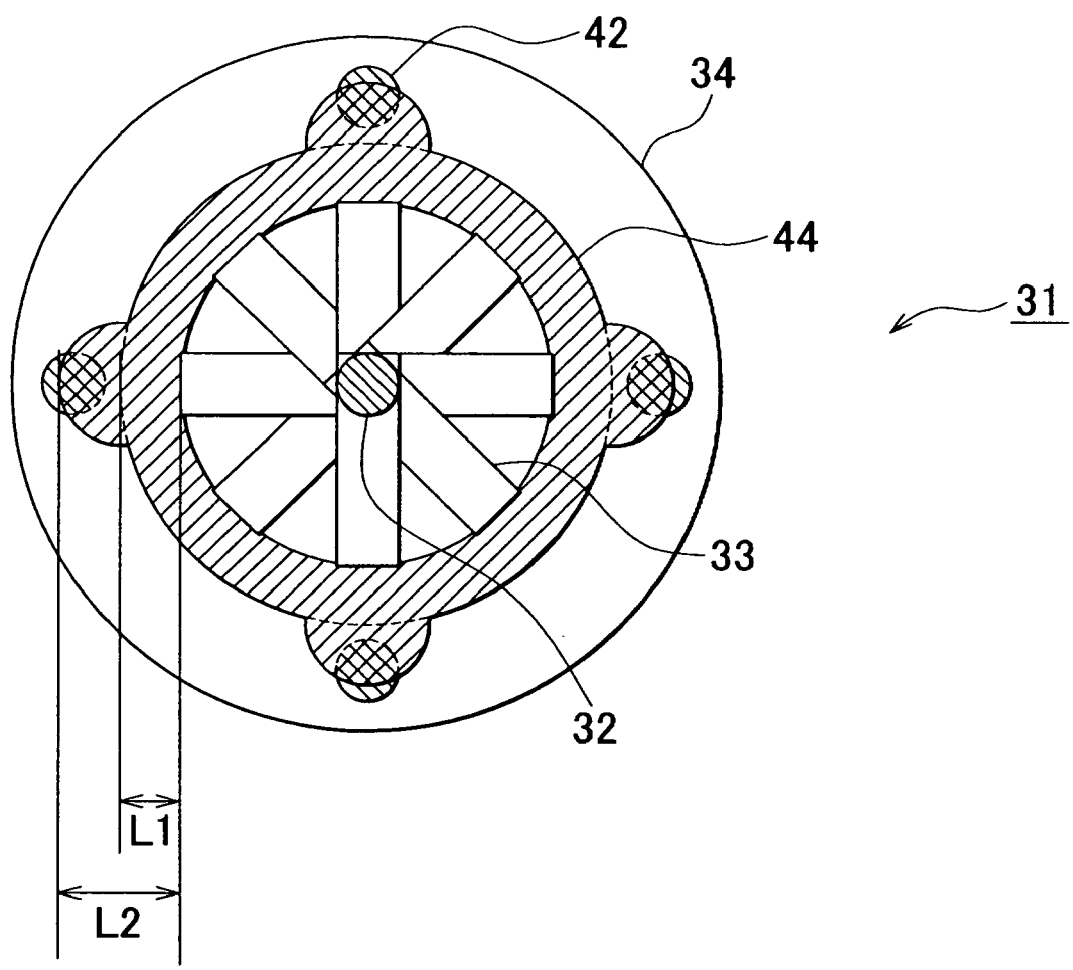
FIG. 14 is the view of a tip turbine-driven ducted fan, viewed from below, according to a modified example of the second embodiment of the invention, in which the size of the negative-pressure forming portion is increased only at the portion below the compressed air outlet.

For example, FIG. 14 shows the tip turbine-driven ducted fan 31 viewed from below. In the tip turbine-driven ducted fan 31, the thickness L2 of the portion of the negative-pressure forming portion, by which the compressed air 46 discharged from the compressed air outlet 42 passes, is equal to or greater than 50% of the length H of the airflow guide portion. Also, the thickness L1 of the other portion of the negative-pressure forming portion is equal to or greater than 10% of the length H of the airflow guide portion.

Thus, the weight of the negative-pressure forming portion 44 is reduced.

In the above-described embodiments of the invention, the ducted fan according to the invention, which serves as a thrust producing device that produces a thrust vertically applied to the vertical take-off and landing aircraft, is mounted in the vertical take-off and landing aircraft. However, the ducted fan according to the invention, which serves as a device that produces a thrust for an aircraft, may be mounted in the aircraft. In this case, the positional relationships such as the "upper portion" and the "lower portion" in the embodiments described above are changed to the relationships concerning the airflows going through the duct such as the "upstream portion" and the "downstream portion". In this case as well, the effects produced by the embodiments described above can be obtained.

While the invention has been described with reference to example embodiments thereof, it should be understood that the invention is not limited to the example embodiments or constructions. To the contrary, the invention is intended to cover various modifications and equivalent arrangements. In addition, while the various elements of the example embodiments are shown in various combinations and configurations, which are exemplary, other combinations and configurations, including more, less, or only a single element, are also within the spirit and scope of the invention.

What is claimed is:

1. A ducted fan that is mounted in an aircraft and serves as a device that produces a thrust for the aircraft, comprising:
   a fan, which generates an airflow that proceeds in a direction substantially parallel to an axial direction of a rotating shaft of the fan;
   a duct arranged around the fan extending in the axial direction of the rotating shaft, that has an airflow inlet defined by an upstream end and an airflow outlet defined by a downstream end, wherein a ramp portion is formed in an inner face of the airflow inlet of the duct;
   an airflow guide portion provided at the airflow outlet that introduces air, which blows against a side face of the duct from an outside of the duct, to a position downstream of the airflow outlet; and
   a negative-pressure forming portion provided at a downstream end of the airflow guide portion, that forms a negative pressure in an area near the downstream end of the airflow guide portion when the air introduced by the airflow guide portion passes by the negative-pressure forming portion, wherein:
      the airflow guide portion is a cylindrical member; and
      an outer diameter of the airflow guide portion is less than an outer diameter of the duct.

2. The ducted fan according to claim 1, wherein
the duct is a cylindrical member coaxial with the rotating shaft of the fan,
the airflow guide portion has an inner diameter substantially equal to an inner diameter of the duct, and
the negative-pressure forming portion has an annular projection formed on an entire outer periphery of the airflow guide portion, at the downstream end of the airflow guide portion.

3. The ducted fan according to claim 2, wherein
a length of the airflow guide portion in an axial direction of the airflow guide portion is equal to or greater than 10% of the inner diameter of the duct.

4. The ducted fan according to claim 2, wherein
a thickness of the airflow guide portion in a radial direction of the airflow guide portion is equal to or greater than 1% of the inner diameter of the duct.

5. The ducted fan according to claim 2, wherein
a thickness portion of the airflow guide portion, to which the annular projection is provided, is equal to or greater than 10% of a length of the airflow guide portion in an axial direction of the airflow guide portion.

6. The ducted fan according to claim 2, wherein
the ducted fan is a tip turbine-driven ducted fan in which compressed air, which blows against a tip turbine fan that is housed in a coaxial annular turbine chamber, turns the fan connected to the tip-turbine fan,
a thickness of a portion of the airflow guide portion, on which the annular projection is formed, in a radial direction of the airflow guide portion is equal to or greater than 10% of a length of the airflow guide portion in an axial direction of the airflow guide portion.

7. The ducted fan according to claim 6, wherein
a thickness part of a part of the portion of the guide portion, on which the annular projection is formed, in a radial direction of the airflow guide portion is equal to or greater than 50% of the length of the airflow guide portion.

8. The ducted fan according to claim 1, wherein
the ramp portion is sloped radially inward from an exterior of the duct toward the airflow inlet opening to increase a flow speed of the airflow.

* * * * *